June 14, 1932.   L. C. NICHOLS   1,862,763
TEMPERATURE INDICATOR
Original Filed March 30, 1922
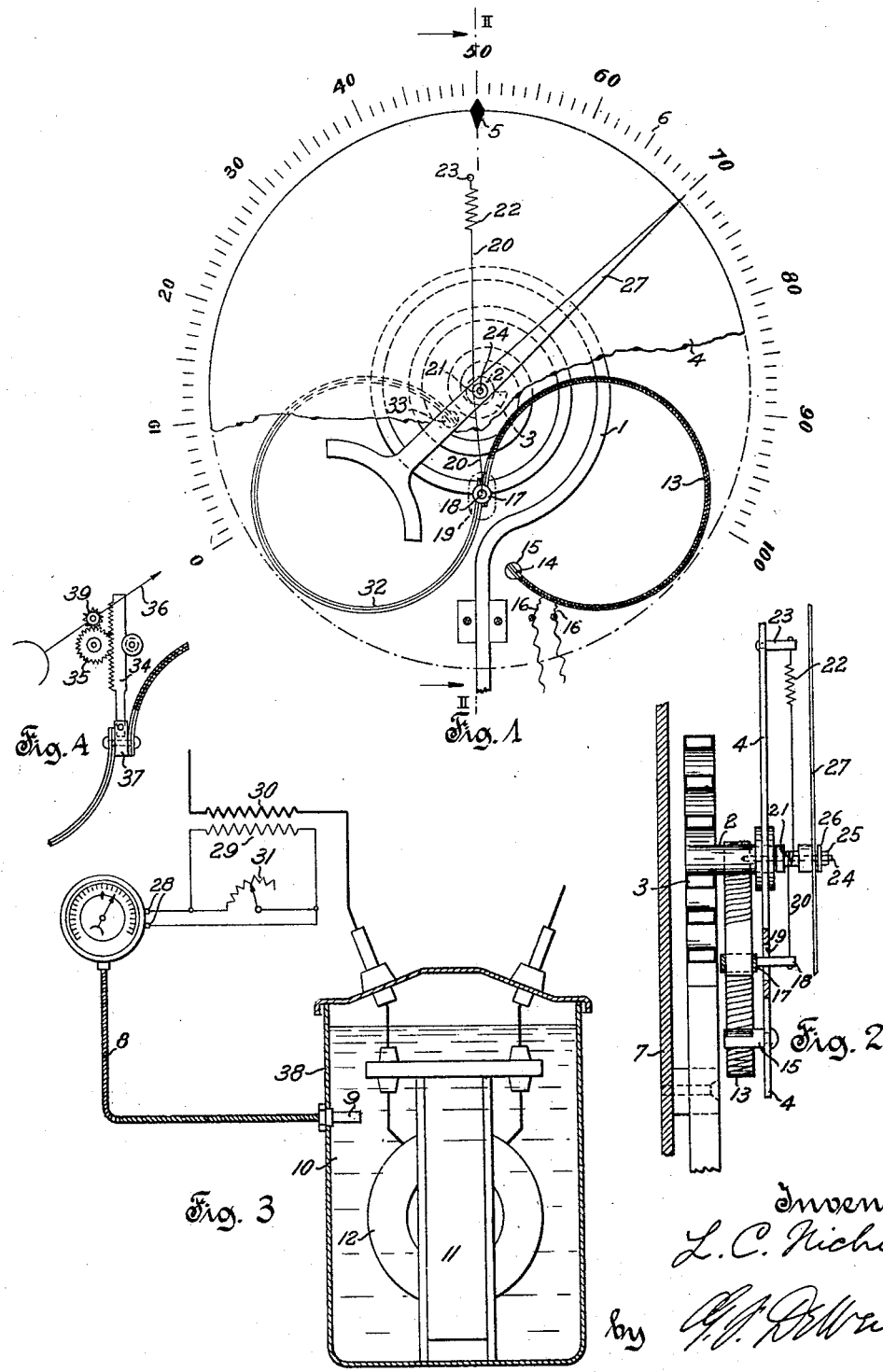

Patented June 14, 1932

1,862,763

UNITED STATES PATENT OFFICE

LOUIS C. NICHOLS, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

TEMPERATURE INDICATOR

Application filed March 30, 1922, Serial No. 547,994. Renewed March 9, 1932.

This invention relates to means for measuring temperatures. It is particularly applicable for measuring the temperature of an electrical conductor disposed in a cooling medium, and may be used for example, for measuring the temperature of the copper in the coils of a transformer immersed in oil.

The temperature of the copper of an oil immersed transformer, when current is flowing in the coils, is evidently always higher than that of the oil. While it is desirable to know the temperature of the oil it is also desirable to know that of the copper. It has been proposed to dispose a thermometer in the transformer oil and then heat this thermometer in proportion to the current flowing in the coil the temperature of which is to be measured. It is obvious that such a procedure immediately destroys the usefulness of the thermometer as an oil temperature reading device, and such an arrangement is difficult of adjustment. It is one of the objects of this invention to obviate these disadvantages.

Another object of the invention is to provide a device in which the temperature of the oil and the temperature of the copper are simultaneously indicated on a single scale.

Still another object of the invention is the provision of a device in which the excess in temperature of the copper over the oil may be indicated.

A still further object is the provision of a device in which the indication of the excess in temperature of the copper over the oil is mechanically added to the indication of the temperature of the oil. Other objects will appear hereinafter as the description of the invention proceeds.

The novel features of the invention will appear from the specification and the accompanying drawings showing several embodiments of said invention and all these novel features are intended to be pointed out in the claims.

Fig. 1 is a more or less diagrammatic front elevation of a device embodying the invention, parts thereof being broken away and the casing omitted.

Fig. 2 is a fragmentary section of the device shown in Fig. 1, along the line II—II looking in the direction of the arrows.

Fig. 3 is a diagram showing the relation of the device of Fig. 1 with respect to a transformer.

Fig. 4 is a fragmentary detail view of a modified form of pointer actuating mechanism.

In the particular embodiment of the invention illustrated in Fig. 1 a Bourdon tube 1 is provided, the inner end 3 of which has a transversely extending stud 2 suitably fastened thereto. The stud 2 has disk 4 rigidly associated therewith. At a suitable location on this disk is an indicator 5, which is here shown in the form of a projection on the disk. The projection and a portion of the disk may, if desired, be suitably painted to accentuate the indicator. It will be apparent as the description proceeds that the member 4 need not be of disk form nor need the pointer 5 be a part of said member. One of the functions of the member 4, if of disk form as in the illustrated embodiment, is to give the instrument a better appearance by concealing the actuating parts. The aforesaid function could obviously be performed by an immovable disk independent of member 4. It will of course be obvious that as to the function of member 4 whereby it serves as a lever extending between the studs 2 and 15, as will more fully appear hereinafter, said member need not be of disk form. It follows that the aforesaid functions need not be performed by the same element. The indicator 5 co-operates with a scale 6 which may be suitably graduated to read in degrees of temperature. The scale 6 may be suitably mounted in any desired manner. The Bourdon tube 1 may be rigidly mounted at its outer end on a base plate 7, in any suitable manner.

Referring now to Fig. 3, the device is here indicated as having the Bourdon tube 1 connected, through a flexible tube 8, to a tube 9 containing any suitable thermally responsive medium whereby, in conjunction with a suitable fluid in the tube 8 and Bourdon tube, the latter may be made responsive to the temperature of the tube 9. The tube 9 is suitably mounted so as project through the casing 38 of the transformer and into the oil 10 which immerses the transformer proper 11. The transformer coils are diagrammatically indicated at 12.

Referring again to Figs. 1 and 2, the device further comprises the thermal motor 13 here shown as including a bimetallic strip 14 which is mounted at one end on a stud 15 in rigid relation with the disk 4. It will be noted that the disk 4 simply serves as a means for mechanically connecting the thermal motor with the stud 2 and therefore with the Bourdon tube. The bimetallic strip 14 has wound thereon a diagrammatically indicated electrical resistance serving as a heating coil having terminals 16. The other end of the bimetallic strip 14 passes through a hole in a clip 17 to which clip it is suitably fastened. The clip 17 is provided with an extension 18 passing through a hole 19 in the disk 4. The hole 19 is made large enough to permit of the effective motion of the extension 18 when actuated by the thermal motor. A thread 20 is fastened at one end to the extension 18, given one or more turns around a pulley 21 and fastened at the other end to a spring 22. The other end of the spring 22 is fastened to a pin 23 mounted on the disk 4. The pulley 21 may be mounted for rotation on a pivot pin 24 which is rigidly associated with the stud 2. The nut 25 and a washer 26 are provided to retain the pulley 21 on the pivot pin 24. The pulley 21 carries a pointer or indicator 27 which is here shown as cooperating with the scale 6.

The terminals 16 of the heating coil are suitably connected, as by means of flexible conductors, with binding posts 28 preferably located on the outside of the casing of the instrument as shown in Fig. 3. The heating coil may be supplied with current varying in the same sense as the current in a transformer coil, the temperature of which is to be measured, by connecting binding posts 28 to the terminals of a secondary 29 of a series transformer having a primary 30 in circuit with the desired lead of the transformer. In order to regulate and calibrate the heating effect in the heating coil an adjustable resistance 31 in shunt with the secondary 29 may be provided.

In order to compensate the thermal motor for changes in temperature in the air surrounding the instrument an additional bimetallic strip 32 may be provided. The strip 32 is so shaped and disposed as to act in opposition to the strip 14. One end of the strip 32 is fastened to a stud 33 mounted on the disk 4; the other end may be disposed adjacent to strip 14 in the hole in the clip 17 and suitably fastened to said clip. The strip 32 is not provided with a heating coil. It is obvious that any changes in the temperature of the air surrounding strips 14 and 32 will tend to actuate them in opposite directions so that no resultant movement will be produced.

It is obvious that the device is susceptible of many changes coming within the spirit and scope of the invention other than those already pointed out. For example, the pointer 27 need not be actuated as illustrated in Figs. 1 and 2. In Fig. 4 the movable ends of the bimetallic strips are shown connected to a rack 34, as by a suitable pivotal connection to a block 37 between the ends of the strips, the rack being shown as in mesh with a gear 35 in mesh with a pinion 39 adapted to operate a pointer 36.

The operation of the device is as follows: Assuming that the transformer coil or conductor to which the thermal motor is responsive has had no current passing therethrough for some time so that the temperature of the copper of the conductor is substantially the same as that of the oil, then the pointer 27 will coincide with the indicator 5 and the latter will indicate oil temperature on the scale 6. If current flows in the transformer coil connected to the series transformer 30, current will be supplied to the heating coil on strip 14 and the thermal motor will act to move pointer 27 in a clock-wise direction an amount beyond indicator 5 such that the excess in temperature of the copper over the oil will be indicated. As the oil heats up the tube 9 will also be heated to a higher degree whereby the Bourdon tube 1 will act to move disk 4 and indicator 5 which latter will as before give the temperature of the oil. As the oil grows hotter, however, it is clear that the temperature of the copper is also higher. This is provided for in the instrument in that as the disk 4 moves, the entire thermal motor and the pointer 27 move along with it. It is therefore clear that the pointer 27 will at all times indicate the actual temperature of the copper. At the same time oil temperature may be read by means of indicator 5.

The instrument may be readily calibrated by adjusting the resistance 31 so that the heating effect of the heating coil on the strip 14 will be the desired amount, the desired reading being obtained by measuring the resistance, for example, of the transformer coil in question when it is hot. The thermal radiation and conduction constants of the heating coil may be varied as desired as will be clear to those skilled in the art.

It should be understood that it is not desired to limit the invention to the exact details of construction herein shown and described, for obvious modifications may occur to a person skilled in the art.

It is claimed and desired to secure by Letters Patent:

1. A device for measuring the temperature of an electrical conductor immersed in a cooling medium, comprising means for indicating temperature and including a member responsive to the temperature of said cooling medium, additional means for indicating temperature and responsive to the current flowing in said conductor, and means for correlating said indicating means to show the sum of the temperature indications.

2. A device for measuring the temperature of an electrical conductor immersed in a cooling medium, comprising means for indicating temperature and including a member responsive to the temperature of said cooling medium, additional means for indicating temperature and responsive to the current flowing in said conductor, and means for mechanically correlating said indicating means to show the sum of the temperature indications.

3. A temperature indicating means comprising a Bourdon tube, a movable indicator, means whereby said tube may actuate said indicator, a second indicator movable relatively to said first named indicator, a thermal motor for moving said second indicator, and means whereby said tube may move said thermal motor.

4. A temperature indicating means comprising a Bourdon tube, a movable indicator, means whereby said tube may actuate said indicator, a second indicator movable relatively to said first named indicator, a thermal motor for moving said second indicator, means for electrically heating said motor, and means whereby said tube may move said thermal motor.

5. A temperature indicating means comprising a Bourdon tube, a movable indicator, means whereby said tube may actuate said indicator, a second indicator movable relatively to said first named indicator, a thermal motor including a bimetallic member for moving said second indicator, and means whereby said tube may move said thermal motor.

6. A temperature indicating means comprising a Bourdon tube, a movable indicator, means whereby said tube may actuate said indicator, a second indicator movable relatively to said first named indicator, a thermal motor including a pair of oppositely acting bimetallic members for moving said second indicator, an electric heating coil for one of said bimetallic members, and means whereby said tube may move said thermal motor.

7. A temperature indicating means comprising a Bourdon tube, an indicator, a second indicator, means whereby said tube may move said indicators in unison, and thermal means whereby said second indicator may be moved in advance of said first indicator.

8. A temperature indicating means comprising a Bourdon tube, an indicator, a second indicator, means whereby said tube may move said indicators in unison, and electro-thermal means whereby said second indicator may be moved in advance of said first indicator.

9. The combination with an oil cooled transformer including an insulated metallic current-carrying winding, of a measuring instrument whereby the temperature of said oil and of said metal are simultaneously indicated when said transformer is under load, said instrument comprising a single scale calibrated in degrees of temperature, an indicator movable over said scale, mechanical means mediately responsive to the thermal condition of said oil for actuating said indicator, a second indicator movable over said scale, means responsive to current flow in said winding for actuating said second indicator, and means for operatively connecting said thermal condition responsive means and said current flow responsive means.

10. A device for measuring the temperature of a current carrying conductor immersed in a cooling medium, comprising in combination, a rotatable member, means for rotating said rotatable member in response to the temperature of said cooling medium, an indicator member, means for moving said indicator member in response to the temperature of said conductor, and means for supporting a portion of said indicator moving means from said rotatable member.

11. In a device for measuring the temperature of a current carrying conductor immersed in a cooling medium, the combination of a movable member, thermoresponsive means for moving said member in accordance with the temperature of said cooling medium, an indicator, means for causing said indicator to move in accordance with the movement of said movable member, means including an electro-thermo device for causing an additional movement of said indicator relative to said movable member in accordance with the current in said electro-thermo device, and a scale arranged in cooperative relation with said indicator.

12. A device for measuring the temperature of an electrical conductor immersed in a cooling medium and the temperature of said cooling medium, comprising in combination, a movable member, an indicator actuated by said member, means for moving said movable member in accordance with the temperature of said cooling medium, a second indicator, and means for moving said second indicator in accordance with the current in said conductor and including a current responsive device carried by said movable member, and a temperature scale arranged in cooperative relation with said indicators.

13. A temperature indicating device comprising, a rotatable member, an indicator rotatably actuated by said rotatable member, a second indicator rotatably mounted concentric of said first mentioned indicator, a Bourdon tube, means operable by said Bourdon tube for rotating both of said indicators in unison, an electro-thermo device carried by said rotatable member, means for causing said electro-thermo device to rotate said second indicator in advance of said first indicator, and a temperature scale arranged in cooperative relation with said indicators.

14. A device for measuring the temperature of a current carrying conductor immersed in a fluid medium comprising in combination, a temperature scale, an indicator arranged for rotational movement relative to said scale, a member immersed in said medium, means responding to the temperature of said member for causing said indicator to rotate relative to said scale, a current transformer having a primary winding energized in accordance with the current in said conductor and having a secondary winding, and means responding to the heating effect of the current in the secondary winding of said transformer for causing said indicator to rotate an additional amount relative to said scale so as to indicate the temperature of said conductor.

15. In a device for measuring the temperature of a current carrying conductor and for measuring the temperature of the cooling medium surrounding said conductor, the combination of an indicator member, means including a bimetallic device for moving said indicator member, means comprising a resistance element for heating said bimetallic device in accordance with the heating effect of the current in said conductor, a second indicator member, means including a temperature responsive device for moving said second indicator member in accordance with the temperature of said cooling medium, and a single temperature scale arranged to cooperate with both of said indicator members.

16. A device for measuring the temperature of a current carrying conductor immersed in a cooling medium, comprising in combination, a Bourdon tube, an indicator member, a tube element connected to said Bourdon tube and adapted to be immersed in a cooling medium, means for causing said Bourdon tube to impart rotational movement to said indicator member in response to the temperature of said medium, means responsive to the current in said conductor for imparting additional rotational movement to said indicator proportional to the difference in temperature of said conductor and the temperature of said medium, and a temperature scale arranged in cooperative relation with said indicator member.

In testimony whereof, the signature of the inventor is affixed hereto.

LOUIS C. NICHOLS.